United States Patent
Lopatin et al.

(10) Patent No.: US 9,239,251 B2
(45) Date of Patent: Jan. 19, 2016

(54) COMPOSITE MATERIAL, MOLDED BODY, ELECTRONIC DEVICE WITH MOLDED BODY, AND METHOD FOR FABRICATING A MOLDED BODY

(75) Inventors: Sergej Lopatin, Lorrach (DE); Thomas Uehlin, Schopfheim (DE); Alexander Gugenberger, Lorrach (DE); Michael Hugel, Lorrach (DE); Andreas Roβberg, Bad Sackingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 238 days.

(21) Appl. No.: 13/813,558

(22) PCT Filed: Jul. 11, 2011

(86) PCT No.: PCT/EP2011/061721
§ 371 (c)(1),
(2), (4) Date: Jan. 31, 2013

(87) PCT Pub. No.: WO2012/016796
PCT Pub. Date: Feb. 9, 2012

(65) Prior Publication Data
US 2013/0125647 A1    May 23, 2013

(30) Foreign Application Priority Data

Aug. 5, 2010  (DE) .......................... 10 2010 038 986

(51) Int. Cl.
*G01D 11/24*    (2006.01)
*G01L 19/06*    (2006.01)
(Continued)

(52) U.S. Cl.
CPC ............ *G01D 11/245* (2013.01); *B01J 20/183* (2013.01); *B01J 20/2803* (2013.01);
(Continued)

(58) Field of Classification Search
CPC ................. B01J 20/183; B01J 20/2803; B01J 20/28026; B01J 20/28042; B01J 20/3007; G01D 11/245; G01L 19/0654; G01L 19/0627; G01L 19/0636; G01L 19/0645
USPC ............................................. 73/431; 252/194
See application file for complete search history.

(56) References Cited

U.S. PATENT DOCUMENTS 4,253,764 A * 3/1981 Morrill ........................ 356/225
4,890,478 A * 1/1990 Claiborne et al. ........... 73/19.11
(Continued)

FOREIGN PATENT DOCUMENTS

CN   1622855 A   6/2005
DE   10122511 A1  11/2002
(Continued)

OTHER PUBLICATIONS

German Office Action, German Patent Office, May 5, 2011.
(Continued)

*Primary Examiner* — John Fitzgerald
*Assistant Examiner* — Natalie Huls
(74) *Attorney, Agent, or Firm* — Bacon & Thomas, PLLC

(57) ABSTRACT

A composite material comprises a polymer matrix; and zeolite, which is bonded in the polymer matrix; wherein the percent of volume of the zeolite in the volume of the composite material amounts to at least 50%, in particular at least 65%. The polymer matrix can in particular comprise a polymer, which is selected from a group of polymers that consist of fluoroplastics, polyaryletherketones, sulphur-containing polymers and high heat resistant polymers. The zeolite comprises in particular a zeolite of type A, in particular a zeolite 4A or 3A.

13 Claims, 3 Drawing Sheets

(51) Int. Cl.
*B01J 20/28* (2006.01)
*B01J 20/18* (2006.01)
*B01J 20/30* (2006.01)
*C08K 3/34* (2006.01)

(52) U.S. Cl.
CPC ..... *B01J 20/28026* (2013.01); *B01J 20/28042* (2013.01); *B01J 20/3007* (2013.01); *G01L 19/0654* (2013.01); *C08K 3/34* (2013.01)

(56) References Cited

U.S. PATENT DOCUMENTS

| | | | |
|---|---|---|---|
| 5,993,589 | A | 11/1999 | Morman |
| 6,226,890 | B1 * | 5/2001 | Boroson et al. ................. 34/472 |
| 6,675,654 | B2 * | 1/2004 | Hegner et al. ................... 73/715 |
| 6,740,145 | B2 * | 5/2004 | Boroson et al. ................. 96/108 |
| 6,843,936 | B1 * | 1/2005 | Jacobs .......................... 252/194 |
| 7,622,199 | B2 * | 11/2009 | Tanaka et al. ................. 428/690 |
| 7,923,921 | B2 * | 4/2011 | Liao et al. ..................... 313/504 |
| 8,052,943 | B2 * | 11/2011 | Amano et al. ................. 422/430 |
| 8,763,466 | B2 * | 7/2014 | Wosnitza et al. ... G01L 19/0654 73/700 |
| 8,852,124 | B2 | 10/2014 | Roe et al. ...................... 600/584 |
| 2005/0238803 | A1 * | 10/2005 | Tremel et al. ................. 427/180 |
| 2009/0188386 | A1 * | 7/2009 | Beatty et al. ..................... 95/91 |
| 2010/0324392 | A1 * | 12/2010 | Yee et al. ...................... 600/345 |
| 2011/0048943 | A1 * | 3/2011 | Nemes .......................... 204/415 |
| 2011/0209552 | A1 * | 9/2011 | Tham et al. ..................... 73/702 |
| 2011/0259828 | A1 * | 10/2011 | Bouvier et al. ............... 210/660 |
| 2012/0077019 | A1 * | 3/2012 | Knoben et al. ............. 428/318.4 |
| 2014/0246316 | A1 * | 9/2014 | Nemes .......................... 204/415 |
| 2014/0298915 | A1 * | 10/2014 | Uehlin et al. ................... 73/753 |

FOREIGN PATENT DOCUMENTS

| | | |
|---|---|---|
| DE | 69729576 T2 | 7/2005 |
| DE | 102008043175 A1 | 4/2010 |
| EP | 1323468 A1 | 7/2003 |
| EP | 1745845 A1 | 1/2007 |
| WO | 02090916 A1 | 11/2002 |

OTHER PUBLICATIONS

English translation of IPR, WIPO, Geneva, Feb. 14, 2013.
Caleb V. Funk, Zeoline-filled microporous mixed matris (ZeoTIPS) Membranes; Prediction of Gas Separation Performance, in Journal of Membrane Science 313 (2008) pp. 224-231.
International Search Report, EPO, The Netherlands, Sep. 30, 2011.
Rat G. Suer, et al., "Gas Permeation Characteristics of Polymer-Zeolite Mixed Matrix Membranes", in Journal of Membrane Science, Elsevier Scientific Publ. Co., Amsterdam, NL, Bd. 91, Nr. 1/02, May 20, 1994, pp. 77-86.

* cited by examiner

COMPOSITE MATERIAL, MOLDED BODY, ELECTRONIC DEVICE WITH MOLDED BODY, AND METHOD FOR FABRICATING A MOLDED BODY

TECHNICAL FIELD

BACKGROUND DISCUSSION

SUMMARY OF THE INVENTION

For this, it is known to provide moisture filters in housing openings, or to arrange absorbers in the housing. However, the described absorbers do not prove to be satisfactory for long term use, in particular under temperature changes. It is therefore an object of the present invention to take corrective action here.

The present invention relates to a composite material, a molded body with such a composite material, an electronic device with such a molded body, and a method for fabricating such a molded body.

Electronic devices often comprise an inherently so designed housing, into which moisture in the form of water vapor can ingress. Condensation of this water vapor onto circuit components in the inside of the housing can lead to adverse effects or, as the case may be, to failure of devices. It is therefore necessary to prevent this long term.

For this, it is known to provide moisture filters in housing openings, or to arrange absorbers in the housing. However, the described absorbers do not prove to be satisfactory for long term use, in particular under temperature changes. It is therefore the object of the present invention to take corrective action here.

The object is achieved according to the invention through the composite material which comprises: a polymer matrix; and a zeolite, which is bonded in the polymer matrix; wherein the portion of volume of the zeolite in the volume of the composite material amounts to at least 50%, in particular at least 65%.

In a further embodiment of the invention, the polymer matrix comprises a polymer, which is selected from a group of polymers that consists of fluoroplastics, polyaryletherketones, sulphur-containing polymers and high heat resistant polymers.

The flouroplastics comprise, according to the invention, PTFE i.e. polytetrafluoroethylene, PCTFE i.e. polychlorotrifluoroethylene, ECTFE i.e. Ethylene chlorotrifluoroethylene or Ethylene-Chlorotrifluoroethylene-Fluorocopolymer, FEP i.e. fluorinated ethylene propylene, PFA i.e. Perfluoroalkoxy alkane as well as PVDF i.e. Polyvinylidene fluoride.

Polyaryletherketones comprise, according to the invention, PEEK i.e. Polyether ether ketone and PEK i.e. Polyetherketone.

The sulphur-containing polymers comprise, according to the invention, PSU i.e. Polysulfone, PES i.e. Polyethersulfone, PPS i.e. Polyphenylene sulfide and PPSU i.e. Polyphenylsulfone.

The high heat resistant plastics comprise, according to the invention, PI i.e. Polyimide, PAI i.e. Polyamide-imide and PEI i.e. Polyetherimide.

In a further embodiment of the invention, the zeolite comprises a group of materials based on aluminosilicate with a structure of zeolite type A, in particular a 4A zeolite or a 3A zeolite.

In a further embodiment of the invention, the density of the material, in a dry condition, amounts to not more than 1.7 $g/cm^3$, in particular not more than 1.5 $g/cm^3$.

In a further embodiment of the invention, the average packing density of the zeolite in the material in a dry condition amounts to not less than 0.8 $g/cm^3$, in particular not less than 1.0 $g/cm^3$.

The molded body according to the invention comprises a composite material according to the invention.

In a further embodiment of the invention, for the volume $V_{min}$ of a minimal convex hull of the molded body and for the surface area $A_{min}$ of the minimal convex hull, $(V_{min})^{2/3}/A_{min} > 1/20$, in particular $>1/10$, is true.

In a further embodiment of the invention, for the volume $V_K$ of the molded body and for the surface area $A_K$ of the molded body, $(V_K)^{2/3}/A_K > 1/30$, in particular $>1/20$, and preferably $>1/15$, is true.

The electronic device according to the invention, which can in particular be a measurement device, comprises at least one housing with at least one inner space, which contains electronic circuits, wherein the device comprises at least one gas line, via which water vapor can enter into the housing, wherein the device according to the invention comprises at least one molded body according to the invention, wherein the molded body can be arranged, in particular, in the inner space.

The electronic device can be, according to the invention, in particular, a measurement device. Such measurement devices can be, in particular, devices of industrial process measurement technology. These sorts of measurement devices usually comprise a sensor and an electronic circuit, which processes the signals of the sensor and prepares them for output to a display or to a control system. Such measurement devices can comprise, in particular, measurement devices for pressure, level, flow, temperature, pH and other analysis parameters.

Moisture problems can arise at arbitrary points in these measurement devices; the electronics and the sensor element are, in particular, to be protected from influences of moisture.

Among the pressure measurement devices, those such as a gauge pressure sensor for measuring the difference between a pressure in a medium and an atmospheric pressure in the neighborhood of the sensor are of particular interest, wherein those devices comprise an atmospheric pressure line in order to expose the gauge pressure sensor to the atmospheric pressure, wherein the atmospheric pressure line runs, in particular, through the molded body.

In general, the invention is also relevant for any kind of electronic device that, in particular, comprises high impedance circuits under the influence of moisture or buildup of condensation. Such devices are, by way of example, hydrophones, ultrasound transducers, microphones, electret microphones and all kinds of capacitive transducers.

According to an embodiment of the invention, the volume of the molded body amounts to not less than 20%, preferably not less than 40% and especially preferably not less than 50% of the free volume of the inner space.

The method, according to the invention, for fabricating a molded body, according to the invention, comprises: Fabricating a dispersion, which contains particles of a polymer for forming a polymer matrix and which contains zeolite; Molding out of the dispersion; and Hardening the molded body In an embodiment, the molding comprises drying the dispersion; pressing the dried dispersion into a mold for molding the molded body. The hardening can comprise sintering in this embodiment, by way of example.

In general, the hardening can also comprise firing or polymerizing, in addition to sintering.

BRIEF DESCRIPTION OF THE DRAWINGS

Other methods, according to the invention, of molding comprise casting, in particular injection molding, and extrusion.

The invention is now explained in greater detail based on the embodiments depicted in the figures. They show.

DETAILED DISCUSSION IN CONJUNCTION WITH THE DRAWINGS

For zeolite in this embodiment, zeolite Purmol 4ST (Z4A) or 3ST (Z3A) from the company Zeochem was selected. Both zeolites are a white powder, which, in a dry condition, react with water in a highly exothermic way. The water absorption of the powder Z4A amounts to 24 mass percent at 50% relative humidity and 20° C. in 24 hours. For powder Z3A, the maximum water absorption amounts to 22 mass percent at equivalent conditions.

For polymer for the polymer matrix in this embodiment, PFA was employed, which was used as an aqueous dispersion DuPont Teflon PFA TE-7224. This dispersion is 60.4 mass percent PFA nanoparticles (50-500 nm), ca. 5 mass percent nonionic surfactants and water. The viscosity is about 20 cP. The pH value amounts to 10, which is more than sufficient to suit the requirements on the pH value of zeolite in water (pH 10.3). The dispersion is completely dried at 100-120° C., at 250-290° C. the surfactants are pyrolysed, at 305-340° C. the PFA particles melt and form a 3D crosslinking in the composite material.

The composition of the composite material is determined with a volume percentage of the active material Z4A in the dry condition. Given that the PFA dispersion is water based, Z4A should be completely saturated with water before it is mixed together with the PFA dispersion.

Table 1 shows the composition of the components for dispersion material with a determined volume percentage of Z4A.

TABLE 1

| Zeolite 4A, Vol. % | Z4A × H2O, Mass - % | PFA Dispersion, Mass - % | Water, Mass - % |
|---|---|---|---|
| 50 | 44.7 | 55.3 | 0.0 |
| 60 | 53.8 | 44.3 | 2.0 |
| 65 | 57.1 | 38.0 | 4.9 |
| 70 | 59.6 | 31.5 | 8.9 |
| 75 | 61.5 | 25.3 | 13.2 |
| 80 | 62.3 | 19.2 | 18.4 |

Figure 1:
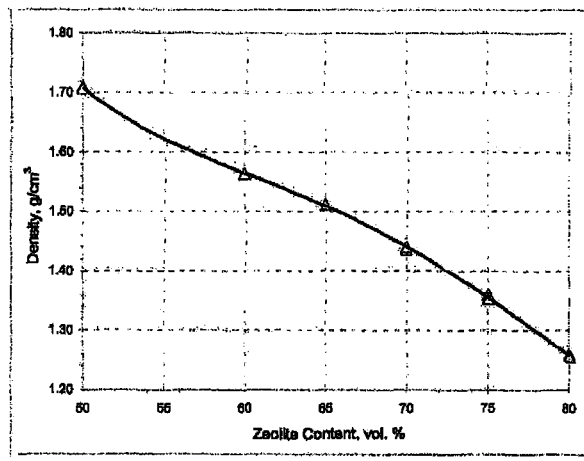
FIG. 1: the density of the dry composite material of an embodiment in dependence on zeolite content.

These components in a liquid state should be well mixed together in a container and be dried at 120° C. The dried mixture can be directly compressed into a form without a binding means. A typical molding pressure is, by way of example, in the range from 25 MPa to 100 MPa. The pressed molded body can be sintered with the following temperature profile, by way of example:

Heating from room temperature to 290° C. in 2 hours
Heating from 290° C. to 320° C. in 2 hours
Heating from 320° C. to 340° C. in 1.5 hours FIG. 1 shows typical density values for the dry composite material of the embodiment in dependence on zeolite content.

Figure 2:
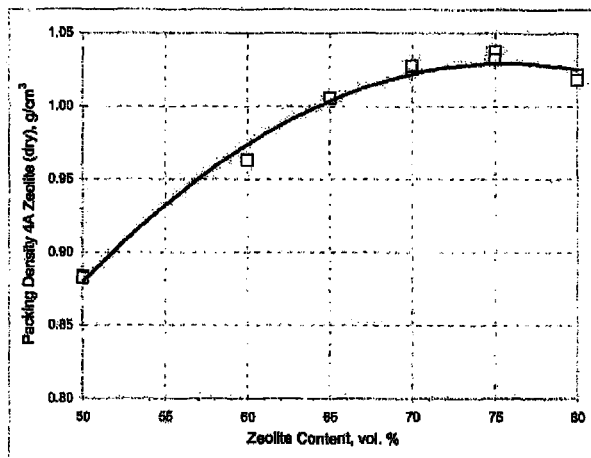
FIG. 2: the packing density of zeolite in the composite material according to the embodiment.

The packing density of the zeolite in the composite material in accordance with the embodiment is depicted in FIG. 2. The packing density is an important property for the water absorption capacity, and it (the packing density) shows how much zeolite is found in 1 $cm^3$ of the composite material.

Figure 3:
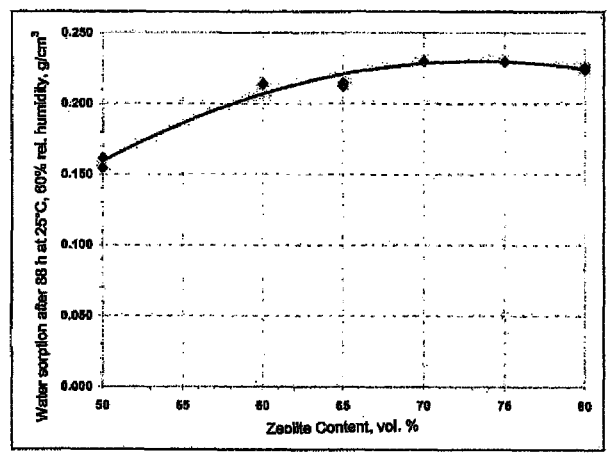
FIG. 3: the water absorption per unit volume of the composite material according to the embodiment.

The optimal composite materials correspond to a zeolite content of 65 volume percent to 80 volume percent. For this range, the zeolite packing density changes little and the water absorption per unit volume of the composite material remains essentially constant, as is depicted in FIG. 3. In the named range of zeolite content one thereby achieves a certain robustness in the face of small variations in the product composition.

Figure 4:
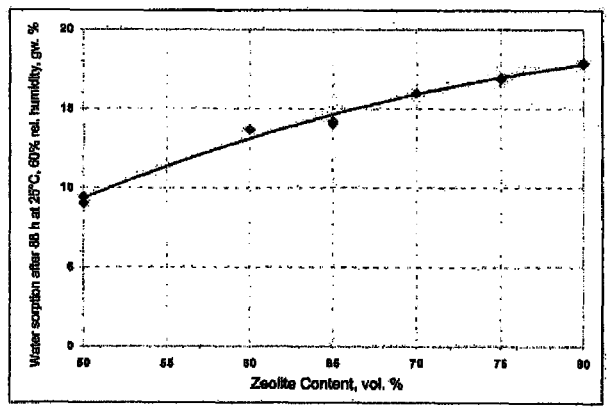
FIG. 4: the water absorption in mass -%.

FIG. 3 shows the water absorption in grams per 1 $cm^3$ of the composite material. In the optimal range, the water absorption is about 0.23 $g/cm^3$ or 14-18 mass percent, as is depicted in FIG. 4. It should be noted in comparison that commercially available granulated zeolite comprises a water absorption of about 0.17 $g/cm^3$ or 24 mass percent, and comprise thereby, in relation to the volume, a drying capacity that is ca. 25% less than does the composite material of the embodiment.

The composite materials according to the invention also differentiate themselves in variable compositions by their mechanical stability, which decreases as the portion of zeolite rises. The composite materials with up to 75 volume percent zeolite are mechanically stable and hard. In excess of 75 volume percent, the composite materials and molded bodies, respectively, are soft and easily crumble. A preferable combination, to date, of mechanical stability and advantageous water absorption is a material with around 60-70 volume percent zeolite.

Figure 5:
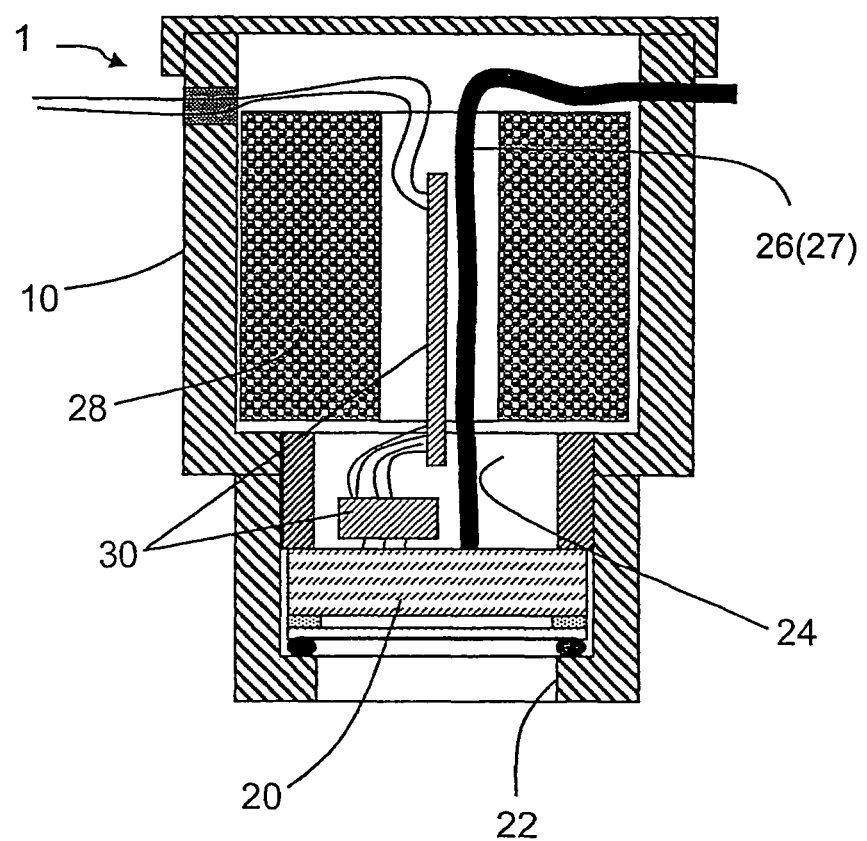
FIG. 5: a schematic longitudinal section of an embodiment of a gauge pressure transducer according to the invention.

The gauge pressure measurement transducer 1 shown in FIG. 5 comprises a housing 10 and a gauge pressure sensor 20, which is arranged in the housing and is exposed to a pressure of a medium via a housing opening 22. A reference air line 26, which comprises a hose 27, is stretched through an inner space 24 of the housing, wherein the reference air line runs through a molded body 28 according to the invention, which is arranged in the inner space 24. The inner space 24 further contains a processing circuit 30 for signals of the gauge pressure sensor and for outputting a signal, which represents gauge pressure, to a control system. The molded body 28 takes up at least 40% of the free volume of the inner space 24, and it is therefore capable of adsorbing moisture ingressing via the reference air or gaps in the subassembly, and thereby prevent water from condensing onto the processing circuit 30 over a time period of years.

The invention claimed is:

1. An electronic gauge pressure measurement transducer, which comprises:
   at least one housing;
   at least one inner space, which contains an electronic circuit;
   a gauge pressure sensor for measuring the difference between a pressure of a medium and an ambient atmospheric pressure near said gauge pressure sensor; and
   an atmospheric pressure line in order to expose said gauge pressure sensor to the atmospheric pressure; and
   at least one molded body comprising a composite material comprising: a polymer matrix; and zeolite, which is bonded in said polymer matrix,
   wherein:
   the portion of volume of said zeolite in the volume of the composite material amounts to at least 65%;
   said molded body is arranged in said inner space;
   the volume of said molded body amounts to not less than 40% of the free volume of said inner space;

water vapor can enter into said at least one housing via said atmospheric pressure line;

said atmospheric pressure line runs through the molded body; and said molded body is capable of adsorbing moisture ingressing via said atmospheric pressure line and thereby prevent water from condensing onto said electronic circuit over a time period of years.

2. The transducer according to claim 1, wherein:
the volume of said molded body amounts to not less than 60% of the free volume of said inner space.

3. The transducer according to claim 1, wherein:
said polymer matrix comprises a polymer, which is selected from a group of polymers that consists of fluoroplastics, polyaryletherketones, sulphur-containing polymers and high heat resistant polymers.

4. The transducer according to claim 1, wherein:
said zeolite comprises a 4A or 3A zeolite.

5. The transducer according to claim 1, wherein:
the average density of said composite material, in a dry condition, amounts to not more than 1.7 g/cm$^3$.

6. The transducer according to claim 1, wherein:
the average density of said composite material, in a dry condition, amounts to not more than 1.5 g/cm$^3$.

7. The transducer according to claim 1, wherein:
the packing density of said zeolite in said composite material in a dry condition amounts to not less than 0.8 g/cm$^3$.

8. The transducer according to claim 1, wherein:
the packing density of said zeolite in said composite material in a dry condition amounts to not less than 1.0 g/cm$^3$.

9. The transducer according to claim 1, wherein:
for the volume $V_{min}$ of a minimal convex hull of said molded body and for the surface area $A_{min}$ of the minimal convex hull, $V_{min}^{2/3}/A_{min} > 1/20$ is true.

10. The transducer according to claim 1, wherein:
for the volume $V_{min}$ of a minimal convex hull of said molded body and for the surface area $A_{min}$ of the minimal convex hull, $V_{min}^{2/3}/A_{min} > 1/10$ is true.

11. The transducer according to claim 1, wherein:
for the volume $V_K$ of said molded body and for the surface area $A_K$ of said molded body, $V_K^{2/3}/A_K > 1/30$ is true.

12. The transducer according to claim 1, wherein:
for the volume $V_K$ of said molded body and for the surface area $A_K$ of said molded body, $V_K^{2/3}/A_K > 1/20$ is true.

13. The electronic measurement device according to claim 1, wherein:
for the volume $V_K$ of said molded body and for the surface area $A_K$ of said molded body, $V_K^{2/3}/A_K > 1/15$ is true.

* * * * *